Feb. 4, 1964  R. H. ALDRICH  3,120,432
DUST COLLECTOR AND SUPPORT FOR THE BAG THEREOF
Filed Aug. 1, 1960  2 Sheets-Sheet 1
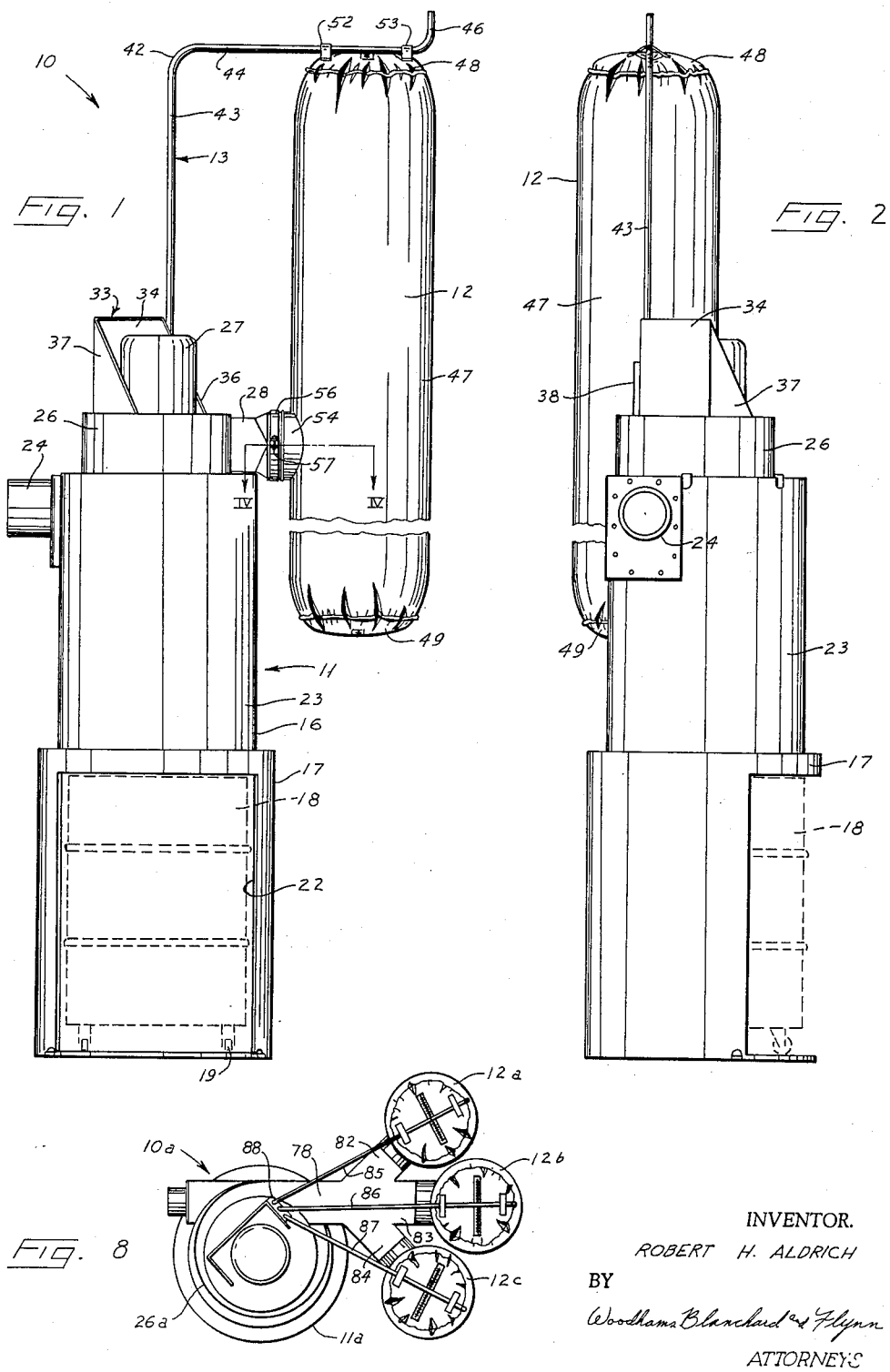
INVENTOR.
ROBERT H. ALDRICH
BY
Woodhams, Blanchard & Flynn
ATTORNEYS Feb. 4, 1964   R. H. ALDRICH   3,120,432
DUST COLLECTOR AND SUPPORT FOR THE BAG THEREOF
Filed Aug. 1, 1960   2 Sheets-Sheet 2

INVENTOR.
ROBERT H. ALDRICH
BY
Woodhams Blanchard and Flynn
ATTORNEYS

United States Patent Office 3,120,432
Patented Feb. 4, 1964

3,120,432
DUST COLLECTOR AND SUPPORT FOR THE
BAG THEREOF
Robert H. Aldrich, Parchment, Mich., assignor to Hammond Machinery Builders, Inc., Kalamazoo, Mich., a corporation of Michigan
Filed Aug. 1, 1960, Ser. No. 46,677
1 Claim. (Cl. 55—315)

This invention relates in general to a cyclone-type dust collector and, more particularly, to a type thereof having an improved dust separating bag and structure for supporting same in a position of maximum efficiency and minimum interference with or by surrounding machinery and/or personnel.

In the interest of cleanness and improved working conditions, many shops have abrading machines, or other dust producing devices of various types, which are equipped with mechanical dust collectors which are attached to the dust producing machines or devices for the purpose of collecting the dust produced thereby. In some shops, it is not unusual to find as many as ten or fifteen, or more, individual, cyclone-type, dust collecting machines each of which is supported upon the floor and is connected to one or more of the dust producing machines. Each of these machines usually is provided with a preliminary dust extraction device, such as a cyclone, which separates the major portion of the dust from a conveying stream. The stream itself, then, may be discharged to the atmosphere outside of the shop, or the stream may be passed through a further separating device, such as a porous bag, to complete (within practical limits) the separation of the dust from the air stream within which it is entrained.

Where such bags are used, they are necessarily quite large. Further, in conventional cyclone-type dust collectors, the inlet duct to the dust separating bag is generally near the upper end of the bag and the bag then extends downwardly. In many instances the bag is either supported directly upon the floor next to the dust collector, or extends downwardly to a point sufficiently close to the floor that the bag prevents effective use of a substantial amount of floor for other purposes. In a plant using a large number of floor mounted dust collectors, the floor space requirements of the dust bags may become a serious problem.

It is often necessary to place dust collectors in such cramped positions and locations with respect to other objects, such as machinery, that, as the dust bag inflates and deflates with the starting and stopping of the collector, the bag may bear against adjacent objects and be abraded or even torn thereby. This may seriously shorten the useful life of such a dust bag.

Accordingly, a primary object of this invention has been the provision of a cyclone-type dust collector having an improved dust separating bag and structure for supporting said bag in an upright position preferably spaced a substantial distance from the floor supporting the dust collecting machine, whereby the floor space under the bag becomes available for other uses and wherein surrounding equipment causes a minimum of interference with the bag in performing the dust separating function.

A further object of this invention has been the provision of an improved dust separating bag and support structure therefore, as aforesaid, which is pleasing in appearance, which is easy to remove and replace, which is inexpensive to fabricate and install, which can be adapted to existing dust collecting machines of a conventional type and which insures more efficient operation, on the average, then that which has been previously possible with existing dust collecting assemblies for the same or similar purposes.

Other objects and purposes of this invention will become apparent to persons familiar with this type of equipment upon reading the following descriptive material and examining the accompanying drawings, in which:

FIGURE 1 is a broken side elevational view of a dust collector assembly including the improved bag construction and support therefor.

FIGURE 2 is a broken side elevational view of said dust collector assembly.

FIGURE 8 is a top plan view of a modified dust collector assembly including three dust separating bags and drawn on a reduced scale as compared to the other figures.

Figure 3:
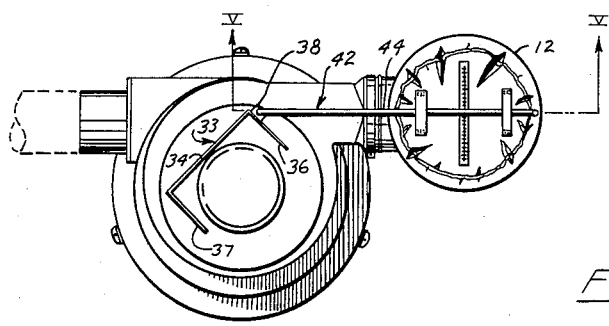
FIGURE 3 is a top plan view of the dust collector assembly shown in FIGURE 1.

For convenience in description, the terms "upper," "lower," and words of similar import will have reference to the dust collector assembly and parts thereof as appearing in FIGURES 1 and 2. The terms "inner," "outer" and words of similar import will have reference to the geometric center of said assembly and parts thereof.

*General Description*

The objects and purposes of the invention, including those set forth above, have been met by providing a dust collector assembly including an upright dust collecting machine having an impeller housing near the upper end thereof with a sidewardly extending outlet pipe. In general, the dust collecting machine has a casing defining a cyclone chamber below the impeller housing and a dust collecting chamber below the cyclone chamber. An L-shaped support rod is mounted upon the upper end of the dust collecting machine and has a leg extending sidewardly above the outlet pipe for releasably engaging the upper end of an elongated dust separating bag. Said dust separating bag has a cylindrical side wall and a pair of end walls the upper of which has means thereon for releasably suspending the bag from the support rod. An inlet duct is secured to and communicates with the interior of the bag between the upper and lower ends thereof and is releasably connected to the outlet pipe of the impeller housing. The bag extends upwardly from the inlet dust a substantial distance and is preferably fabricated with the inlet duct closer to the lower end than to the upper end of the bag. The lower end wall of the bag is provided with an opening having means for opening or closing same as desired. A similar opening may for convenience be provided in the upper end wall of the bag. The inlet duct of the bag is releasably connected to the outlet pipe of the housing by clamping means which can be quickly and easily released for removal and replacement of the bag.

*Detailed Construction*

The dust collecting assembly 10, which has been selected to illustrate a preferred embodiment of the invention (FIGURES 1 and 2) is comprised of a dust collecting machine 11, a dust separating bag 12 and support structure 13 mounted upon the machine 11 for suspending the bag 12 which is connected to the machine 11.

The dust collecting machine (FIGURES 1 and 2) has an upright casing 16 the lower portion of which defines the substantially cylindrical dust collecting chamber 17. A barrel, which is indicated in broken lines at 18, may be mounted upon casters 19 for easy movement through the access opening which communicates with the dust chamber 17. Accordingly, dust is deposited through the open upper end of the barrel 18 thereinto.

The casing 16 also defines a substantially cylindrical cyclone section 23 directly above the dust chamber 17 and having an inlet pipe 24 communicating with the cyclone chamber therein in a substantially conventional manner. A centrifugal impeller housing 26 is mounted with its rotational axis in a vertical direction upon the upper end of the cyclone section 23 so that its inlet opening communicates with said cyclone chamber. A motor 27 is mounted upon the upper side of the impeller housing 26 for rotating the impeller, not shown, therein. The impeller housing 26 has an outlet pipe 28 arranged in a conventional manner. The outlet pipe 28 (FIGURE 4) preferably has an end portion 29 of circular cross section which is provided with an annular external ridge 32 for reasons appearing hereinafter.

The support structure 13 includes a mounting bracket 33 which is secured, as by welding or bolting, upon the upper surface of the impeller housing 26 adjacent the motor 27. In this particular embodiment, the mounting bracket 33 is somewhat channel-shaped in that it has a substantially vertical web 34 and a pair of triangular shaped, substantially parallel flanges 36 and 37 which extend in the same direction substantially perpendicularly from the web 34. A rod supporting block 38 (FIGURE 5), which has a lengthwise rod opening 39, is secured to the flange 38 in an upright position adjacent the web 34.

The support structure 13 (FIGURES 3 and 5) also includes a substantially L-shaped support rod 42 having a vertical leg 43, the lower end of which is slidably and snugly receivable into the rod opening 39. The horizontal leg 44 of the support rod 42 has an upwardly turned end portion 46 which can be positioned a substantial distance outwardly of the outer end of the outlet pipe 28.

Figure 6:
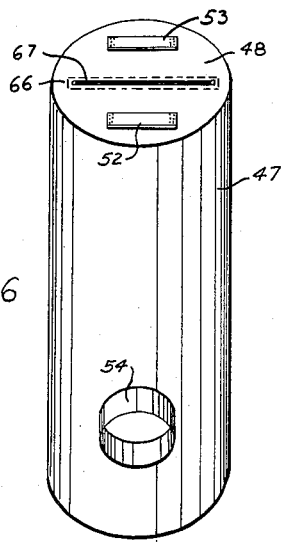
FIGURE 6 is a perspective view of the dust separating bag in its extended position to show constructional details.

The dust separating bag 12 (FIGURES 1 and 6) has a cylindrical side wall 47 and a pair of circular, substantially parallel end walls 48 and 49 which may be substantially identical in size and shape. The side wall 47 and end walls 48 and 49 are preferably fabricated from a strong porous fabric, such as canvas, which is capable of permitting air to pass therethrough but which tends to collect any dust entrained in such air. The upper end wall 48 (FIGURES 5 and 6) has a pair of spaced, substantially parallel straps 52 and 53 which are secured at the opposite ends of each to said end wall 48 for insertion of the leg 44 of the rod 42 between said straps and the end wall 48 for the purpose of supporting the bag 12. An inlet duct 54 is secured to the sidewall 47 of the bag 12 and communicates with the interior thereof, preferably but not necessarily near one end of the bag. The inlet duct 54 is slightly larger in internal diameter than the external diameter of the end portion 29 of the outlet pipe 28 for reception of said end portion into the inlet duct. The free end of the inlet duct 54 preferably extends beyond the annular ridge 32 for snug encirclement by the split clamping ring 56 which is held in clamping condition in any convenient manner, such as by a bolt 57 extending through suitable flanges on the ends of the clamping ring. Sliding of the split ring 56 and the inlet duct 54 off the end of the outlet pipe 28 is prevented by the annular ridge 32.

The lower end wall 49 (FIGURE 4) of the bag 12 has a diametrically disposed opening 62, which is provided with a zipper 63 in this particular embodiment, for the purpose of discharging the contents of the bag 12. A flap 64 is secured to the inner surface of the end wall 49 and extends over the zipper 63 to prevent the accidental escape of dust particles therethrough. The lengthwise extent of the opening 62 is preferably transverse of a vertical plane including the axis of the inlet duct 54. The upper wall 48 also has a diametrically disposed opening 66 provided with a zipper 67 and preferably arranged substantially parallel with the opening 62, hence, also transversely of the central axis of the inlet duct 54. A flap 68 is secured to the inner surface of the end wall 48 to cover the opening 66 when the zipper 67 is closed.

*Alternate Structures*

Figure 4:
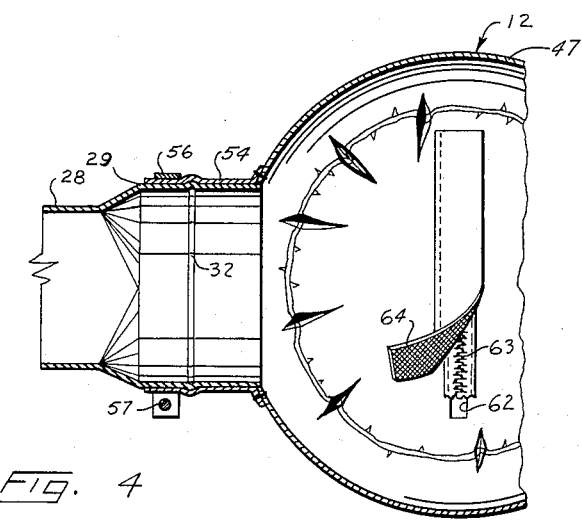
FIGURE 4 is a sectional view taken along the line IV—IV in FIGURE 1.
Figure 7:
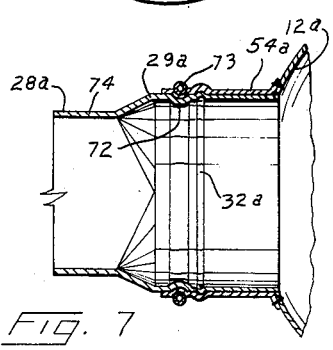
FIGURE 7 is a fragment of FIGURE 4 showing a modified outlet pipe for the dust collecting machine.

As shown in FIGURE 7, the end portion 29a of the outlet pipe 28a, which may be generally similar to the outlet pipe 28 of FIGURE 4, has an annular groove 72 in its external surface inwardly of the annular ridge 32a. The inlet duct 54a, which may be substantially identical to the inlet duct 54 is urged into the annular groove 72 by a resiliently flexible annular member 73 which may be an elastic ring or a substantially continuous spiral spring. The tension of the annular member 73 when received into the groove 72 will be sufficient to prevent disengagement of the inlet duct 54a from the outlet pipe 28a under the normal pressures produced by the dust collecting machine associated therewith, but will be sufficiently maneuverable that it can be manually dislodged from the annular groove 72 and moved leftwardly onto the smaller portion 74 of the outlet pipe 28a for the purpose of removing and/or replacing the dust separating bag 12a including the inlet duct 54a. When inlet duct 54a has been replaced upon the outlet pipe 28a, the resilient annular member 73 is again moved outwardly upon the end portion 29a and into the annular groove 72.

As shown in FIGURE 8, it may be desirable under some circumstances to connect the dust collecting machine 11a to a plurality of dust separating bags 12. In such case, the impeller housing 26a (FIGURE 8) is provided with an outlet pipe 78 having three intercommunicating end portions 84, 82 and 83 which are each connectible to the inlet ducts 54, respectively, on each of the three dust separating bags 12a, 12b and 12c. The manner of connection may be substantially the same as set forth above with respect to the outlet pipe and inlet duct structure shown in FIGURE 4.

Figure 5:
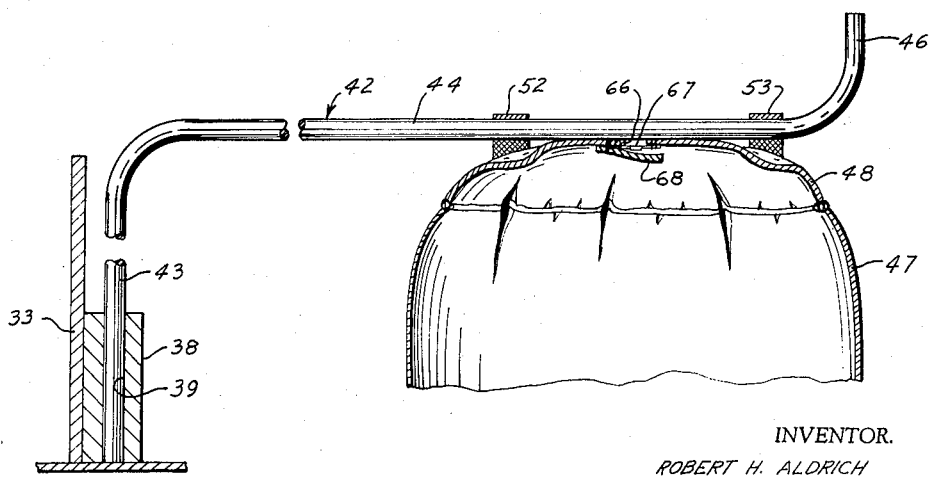
FIGURE 5 is a sectional view taken along the line V—V in FIGURE 3.

Three L-shaped support rods 85, 86 and 87, which may be substantially identical to the support rod 42 (FIGURE 5), are slidably supported upon a rod block 88 (FIGURE 8) which may be identical to the rod block 38 (FIGURE 6), said rod block 88 being mounted upon the mounting bracket 33a for the purpose of engaging and supporting the three bags 12, each in substantially the same manner as set forth above with respect to the structure shown in FIGURE 5.

*Operation*

Generally speaking the operation of the dust collecting assembly 10 (FIGURES 1 and 2), or the dust collecting assembly 10a of FIGURE 8, will be evident from the descriptive material set forth above. That is, air laden with particulate materials is delivered to the inlet pipe 24 (FIGURE 1) by a suitable conduit indicated in broken lines at 89 in FIGURE 3, which is itself connectible in a conventional manner to a hood, not shown, associated with the dust producing machine. The dust laden air is then circulated through the cyclone section 23 which separates out the major part of the dust and deposits same in the barrel 18 (FIGURE 1). The partially cleansed air is then moved through the impeller housing 26 and through the outlet pipe 28 thereof and the inlet duct 54 into the dust bag 12 where the remaining dust is collected within said bag as the air moves through the pores thereof.

This same procedure for dust collection and air circulation will occur in the dust collecting assembly 10a of FIGURE 8, except that a greater amount of air can be moved through the assembly due to the larger bag capacity, and yet without incurring the handling problems incident to the use of a single large bag of corresponding surface area. Inasmuch as the major part of each dust bag 12 is disposed above the dust collecting machine 11 or 11a, there is seldom anything normally in the vicinity of the bag to abrade or tear same. Moreover, this arrangement increases substantially the amount of floor space available adjacent to the dust collector for the location of machinery or for the movement of personnel.

If it becomes desirable to remove or replace the bag 12, such can be quickly and easily accomplished by loosening the screw 57 and enlarging the split ring 56 so that the inlet duct 54 can be moved off the outlet pipe 28. The support rod 42 can then be raised out of the socket 39 in the block 38 after which the straps 52 and 53 are disengaged from the horizontal leg 44 of the rod 42. Replacement of a new bag 12 is accomplished by reversing the above procedure.

Although particular preferred embodiments of the invention have been disclosed above in detail for illustrative purposes, it will be understood that variations or modifications of such disclosure, which lie within the scope of the appended claim, are fully contemplated.

What is claimed is:

In a dust collector having a removable dust collecting receptacle, the combination comprising:

an upright casing structure having wall means defining a dust collecting chamber in the lower end thereof and having a cyclone chamber in the upper end thereof communicating with said dust collecting chamber;

a sidewardly facing opening in the wall means defining said collecting chamber, said opening extending substantially the vertical length of said collecting chamber for receiving the collecting receptacle into the collecting chamber;

a centrifugal impeller housing mounted upon said casing and having a downwardly facing inlet opening communicating with the upper end of said cyclone chamber;

a horizontal inlet pipe connected to the upper region of said cyclone chamber;

a horizontal outlet pipe connected to the outlet opening of the impeller housing and extending tangentially therefrom;

an electric motor mounted on the top of said impeller housing and having a vertical shaft extending downwardly into said housing;

a centrifugal impeller mounted upon said shaft for rotation about a vertical axis within said impeller housing, whereby rotation of said impeller will draw dust-laden air through said inlet pipe so that heavy particles of dust will be removed by the cyclone chamber and collected in a dust collecting receptacle within said dust collecting chamber, and the air with the remainder of the dust entrained therein will be discharged through said outlet pipe;

an elongated, substantially cylindrical bag having a pair of substantially parallel end walls and a substantially cylindrical side wall, at least said side wall being fabricated from porous material;

support means mounted upon said casing for releasably supporting said bag with respect to said casing structure whereby said bag may be suspended substantially vertically downwardly from said support means;

an inlet duct connected to the side wall of said bag between and spaced from the ends thereof and communicating with the interior of said bag;

means for connecting said inlet duct to said outlet pipe so that one end wall of said bag can be held above said outlet pipe and the other end wall will be located below said outlet pipe;

an opening in one end wall of said bag and means for releasably closing same.

References Cited in the file of this patent

UNITED STATES PATENTS

| 162,679 | Neff | Apr. 27, 1875 |
| 1,260,407 | Lachmann et al. | Mar. 26, 1918 |
| 1,354,847 | Savage | Oct. 5, 1920 |
| 1,428,583 | Deutsch | Sept. 12, 1922 |
| 1,761,377 | Waring | June 3, 1930 |
| 1,813,896 | Paine | July 7, 1931 |
| 1,886,884 | Jones | Nov. 8, 1932 |
| 2,456,639 | Lanter | Dec. 21, 1948 |
| 2,540,919 | Vallas | Feb. 6, 1951 |
| 2,607,436 | Martin | Aug. 19, 1952 |

FOREIGN PATENTS

| 611,252 | Germany | Mar. 25, 1935 |